(12) United States Patent
Oliver (10) Patent No.: US 8,733,191 B2
(45) Date of Patent: May 27, 2014

(54) POWER TAKE OFF ARRANGEMENT FOR A MOTOR VEHICLE

(75) Inventor: Robert Andrew Oliver, Preston (GB)

(73) Assignee: Torotrak (Development) Limited, Leyland, Lancashire (GB)

( * ) Notice: Subject to any disclaimer, the term of this patent is extended or adjusted under 35 U.S.C. 154(b) by 1193 days.

(21) Appl. No.: 11/917,739

(22) PCT Filed: Apr. 21, 2006

(86) PCT No.: PCT/EP2006/061769
§ 371 (c)(1),
(2), (4) Date: Aug. 20, 2009

(87) PCT Pub. No.: WO2006/133987
PCT Pub. Date: Dec. 21, 2006

(65) Prior Publication Data
US 2009/0305840 A1    Dec. 10, 2009

(30) Foreign Application Priority Data

Jun. 14, 2005    (GB) .................................... 0512029.0

(51) Int. Cl.
*F16H 27/00* (2006.01)
*B60K 25/00* (2006.01)
*F16H 61/664* (2006.01)

(52) U.S. Cl.
CPC ............ *F16H 61/6648* (2013.01); *B60K 25/00* (2013.01); *F16H 2302/00* (2013.01); *Y02T 10/76* (2013.01)
USPC .............................. 74/15.4; 74/15.84; 476/40

(58) Field of Classification Search
USPC ............ 476/40, 42; 74/11, 15.4, 15.82, 15.84
See application file for complete search history.

(56) References Cited

U.S. PATENT DOCUMENTS

| 4,186,616 | A |   | 2/1980  | Sharpe |
| 5,085,107 | A | * | 2/1992  | Tatara ............................ 477/45 |
| 5,971,876 | A | * | 10/1999 | Spiess et al. .................... 474/28 |

(Continued)

FOREIGN PATENT DOCUMENTS

| EP | 0 427 303 A1 | 5/1991 |
| EP | 0 736 153 B1 | 3/1998 |

(Continued)

OTHER PUBLICATIONS

PCT/EP/2006/061769, International Preliminary Report on Patentability and Written Opinion, Date of Issuance Dec. 17, 2007, 6 pages.

(Continued)

*Primary Examiner* — David M Fenstermacher
(74) *Attorney, Agent, or Firm* — Blakely, Sokoloff, Taylor & Zafman LLP (57) ABSTRACT

A drive arrangement is disclosed for a motor vehicle power take off (PTO). The arrangement comprises a PTO shaft 104,158,207 of a known type intended for coupling to a power driven implement. An input shaft is arranged to be coupled to a rotary driver such as an engine. A continuously variable transmission such as 10 is coupled between the input and PTO shafts to transfer drive between them at a continuously variable ratio. In accordance with the invention, the continuously variable transmission is constructed and arranged such as to regulate torque and to automatically accommodate changes in speed at the PTO Shaft by virtue of changes in its drive ratio.

18 Claims, 4 Drawing Sheets

(56) References Cited

U.S. PATENT DOCUMENTS

| | | | |
|---|---|---|---|
| 6,561,940 B2 | 5/2003 | Goi et al. | |
| 7,090,601 B2 * | 8/2006 | Schonnenbeck | 474/18 |
| 7,160,220 B2 | 1/2007 | Shinojima et al. | |
| 7,537,543 B2 * | 5/2009 | Shimazu et al. | 477/48 |
| 2003/0070819 A1 | 4/2003 | Hrazdera | |
| 2004/0132567 A1 | 7/2004 | Schonnenbeck | |
| 2005/0037887 A1 | 2/2005 | Shinojima et al. | |

FOREIGN PATENT DOCUMENTS

| | | |
|---|---|---|
| EP | 0 894 210 B1 | 5/2000 |
| EP | 1 106 870 A2 | 6/2001 |
| EP | 1 071 891 B1 | 6/2002 |
| EP | 1 606 135 B1 | 10/2006 |
| GB | 2 034 421 A | 6/1980 |
| JP | 5-1754 | 1/1993 |
| JP | H07-132757 | 5/1995 |
| JP | 9-166195 | 6/1997 |
| JP | 2001-158400 A | 6/2001 |
| JP | 2002-084816 A | 3/2002 |
| JP | 2004-237767 A | 8/2004 |
| JP | 2005-036878 A | 2/2005 |
| SU | 1020051 A1 | 5/1983 |
| WO | WO 95/17621 | 6/1995 |
| WO | WO 97/40292 | 10/1997 |
| WO | WO 99/54646 | 10/1999 |
| WO | WO 2004/063601 A1 | 7/2004 |
| WO | WO 2004/085190 A1 | 10/2004 |
| WO | WO 2005/015058 A1 | 2/2005 |

OTHER PUBLICATIONS

PCT International Search Report for PCT Counterpart Application No. PCT/EP2006/061769, 3 pgs., (Aug. 11, 2006).

PCT Written Opinion of the International Searching Authority for PCT Counterpart Application No. PCT/EP2006/061769, 5 pgs., (Aug. 11, 2006).

Great Britain Search Report for Great Britain Counterpart Application No. GB0512029.0, 3 pgs., (Oct. 10, 2005).

Japanese App. No. 2008-516256, Decision of Rejection, Mar. 2013, 1 page.

Korean App No. 10-2007-7027714, Notice to File a Response, Jan. 9, 2013, 4 pages.

* cited by examiner

POWER TAKE OFF ARRANGEMENT FOR A MOTOR VEHICLE

CROSS-REFERENCE TO OTHER APPLICATIONS

This is a National Phase of International Application No. PCT/EP2006/061769, filed on Apr. 21, 2006, which claims priority from Great Britain Patent Application No. 0512029.0, filed on Jun. 14, 2005.

BACKGROUND OF THE INVENTION

The present invention relates to power take off arrangements for motor vehicles.

"Power take off arrangement" as used herein refers to arrangements for transmitting rotary drive from the engine (or other rotary driver, such as an electric motor) of a motor vehicle to some point of power usage other than the vehicle's driven wheels. The phrase will be abbreviated to "PTO". Agricultural vehicles such as tractors are conventionally provided with a PTO for connection to power driven attachments such as harvesters, grass cutters, driven-wheel trailers and so on. The PTO typically comprises a drive shaft coupled to the engine through some form of transmission and provided with means for forming a releasable coupling to a shaft of the attachment. PTOs are not solely used in agricultural vehicles. Military vehicles also use PTOs for driving driven-wheel trailers and other implements, and there are other fields in which PTOs have actual or potential applications.

Conventional agricultural PTOs are typically intended to run at fixed speed. A fixed ratio gearbox, typically separate from the vehicle's transmission, provides one or a set of drive ratios and the vehicle's speed-governed diesel engine is set to a fixed speed to provide the required PTO output speed. A clutch is needed between the engine and the PTO to de-couple the two when drive is not required at the PTO.

This conventional PTO technology suffers from several drawbacks. One is encountered upon "launch"—i.e. when applying drive to the PTO output to accelerate it from a standstill to the required operating speed. The driven implement often possesses a large moment of inertia, which needs to be accelerated over an appreciable period of time to reach its operating speed. When the clutch is first engaged, the mismatch of speeds between the engine and the PTO shaft results in a sudden and undesirable shock and may cause the engine to stall. Operators learn to repeatedly engage and disengage the clutch to effect launch, a crude approach that can result in equipment damage. A more controlled launch would be desirable.

Another problem arises in connection with driven wheel trailers. Many agricultural and military vehicles take drive to the wheels of a trailer through a power take off, helping the vehicle for example in traversing rough terrain. The speed over the ground of the trailer wheels is not always the same as that of the driven vehicle wheels. When cornering, for example, the different wheels follow paths of different radii and thus traverse the ground at different speeds. The wheels' relative speed of rotation, however, is fixed by virtue of the ratios provided by the transmission(s) driving them, no differential gear normally being provided. Consequently wheel slip is inevitable, but is accompanied by very large and undesirable power recirculation through the transmission(s). Despite the robust construction of agricultural vehicles, expensive failures do occur as a result. The problem arises not only due to cornering, but also because of mismatches in wheel size, uneven terrain etc. It would be desirable to provide some means of driving the PTO which enabled it to match its speed to that of the vehicle driven wheels, while providing the necessary trailer wheel torque.

Another problem of known PTOs concerns energy efficiency. Normally fixed drive ratios are chosen on the basis that the engine is to operate at high speed, at or near the speed at which it is capable of providing its peak power. This is so that when necessary high power can be provided to the driven implement without departing from its required drive speed. The result is that even when the power required by the implement is relatively low, the engine must be run at the same fixed high speed, which burns fuel unnecessarily.

A final difficulty is encountered when the load on the PTO varies. An example is encountered when using a forage harvester, an implement which is mounted upon the vehicle to collect cut material, and which consumes high power. When the forage harvester encounters a particularly dense region of material, the torque needed to drive it increases. The power needed to maintain PTO speed may exceed that available from the engine. In this situation it is desirable to permit the PTO to slow down, rather than stall the engine. Preferably in doing so a high engine speed should be maintained in order to provide high engine power.

It has previously been proposed to use a continuously variable transmission—that is, a transmission able to provide a stepless variation in drive ratio—to drive a PTO. Reference is directed in this regard to published international patent application US2003/0070819, application Ser. No. 10/236,589, in the name of Hrazdera. Advantages arising from the use of a CVT, including improved launch and flexibility in the speed of the driving engine, are recognised therein. Problems of control remain. For example a conventional CVT does not in itself protect the engine from stall in response to excess load created by the load Searches conducted by the European Patent Office on the present invention contained reference to EP1106870 (Kawasaki Jukogu Kabushiki Kaisha). This describes an apparatus for driving an aircraft generator from a jet engine at constant speed. The apparatus uses a full or part-toroidal variator to regulate the generator speed, but it is clear that this is a ratio controlled device. Reference is directed in this regard to FIG. 10 in the related description at paragraph 55. The same search drew attention to U.S. Pat. No. 4,186,616 (Sharpe) which again concerns a transmission intended for driving an aircraft alternator. It uses a toroidal type variator, but whether this is torque controlled is not specified. Of course an alternator drive for an aircraft is not a power take off for a motor vehicle, in the sense in which that phrase is used herein.

SUMMARY OF THE INVENTION

In accordance with a first aspect of the present invention, there is a drive arrangement for a motor vehicle power take off (PTO) comprising a PTO shaft arranged and adapted for coupling to a power driven implement, an input shaft arranged and adapted for coupling to a rotary driver, and a continuously variable transmission coupled between the input and PTO shafts to transfer drive between them at a continuously variable drive ratio, characterised in that the continuously variable transmission is constructed and arranged such as to regulate transmission reaction torque, and to automatically accommodate changes in speed at the PTO shaft by virtue of changes in its drive ratio.

The rotary driver may be an internal combustion engine, particularly a diesel engine, but the invention is conceivably applicable to vehicles using instead electric motors, external combustion engines etc. to provide rotary drive.

It is particularly preferred that the transmission comprises a ratio varying unit ("variator") which has a rotary variator input and a rotary variator output and is constructed and arranged to regulate reaction torque, defined as the sum of torques at its input and output. This type of functionality can be provided by a variator of toroidal-race rolling-traction type.

It is preferred that the variator is associated with a controller for controlling variator reaction torque to provide constant PTO speed during normal operation. "Normal" as used in this context excludes launch, when of course the PTO speed must be progressively changed, and conditions where PTO load becomes excessive. The control of reaction torque may be based upon feedback of PTO shaft speed.

The present invention is particularly advantageous with regard to managing situations where PTO load becomes excessive, which can, with known PTO arrangements, overload the engine and cause it to stall. The natural response of a transmission which regulates torque to such an overload is to allow the PTO shaft to slow down by virtue of a change in drive ratio, which reduces the power requirement of the engine (without forcing it to change its speeds so that engine power can be maintained) and increases the torque available at the PTO shaft. In fact the transmission's response is precisely what is required to keep both the PTO-driven implement and the engine functioning properly. The situation is complicated slightly where, for example, a controller is provided which tends to maintain PTO shaft speed. In this context the controller strategy is preferably modified somewhat in response to a potential overload.

The controller preferably limits reaction torque to avoid excessive engine loading such that in response to excessive load applied to the PTO shaft, reaction torque is limited by the controller and slowing of the PTO shaft due to the load applied to it is automatically accommodated by virtue of a change in variator ratio.

It is particularly preferred that the transmission further comprises an epicyclic shunt gear operably coupled to the variator and to the PTO.

In one such embodiment, respective inputs of the shunt gear are coupled to the input shaft through the variator and through a fixed ratio gear chain, such that at a certain variator ratio the two shunt inputs cancel each other out and provide a geared neutral state in which the PTO shaft is stationary despite being mechanically coupled to the moving input shaft. A clutch for disengaging the PTO from the input shaft may in some such embodiments be dispensed with.

Without a clutch, it is desirable to provide in some manner for a "neutral" state in which the PTO shaft is able to freewheel. This too can be provided by virtue of the present invention. Preferred embodiments have means for setting the variator reaction torque to zero and thereby providing a quasi-neutral state in which the PTO shaft is able to freewheel despite being mechanically coupled to the input shaft.

Means are preferably provided for controlling launch of the PTO from the quasi-neutral state by raising variator reaction torque to create a driving torque at the PTO shaft, while the variator automatically accommodates consequent acceleration of the PTO shaft by virtue of changes in its drive ratio.

In accordance with a second aspect of the present invention, there is a method of controlling a motor vehicle power take off comprising a PTO shaft arranged and adapted for coupling to a power driven implement, an input shaft arranged and adapted for coupling to a rotary driver, and a continuously variable transmission coupled between the input and PTO shafts to transfer drive between them, comprising regulating transmission reaction torque and permitting transmission ratio to vary in accordance with changes in output speed resulting from application of consequent transmission output torque to an inertial load referred to the PTO shaft.

BRIEF DESCRIPTION OF THE DRAWINGS

Specific embodiments of the present invention will now be described, by way of example only, with reference to the accompanying drawings, in which:—

DETAILED DESCRIPTION OF THE INVENTION

In the embodiments of the invention to be described below, the power take off is driven by the rotary driver (typically the diesel engine of the motor vehicle) through a transmission, and more particularly a continuously variable ratio device ("variator"), which operates to regulate torque rather than ratio. Such transmissions will be referred to below as being of "torque-controlled" type. The concept is known from various publications by the applicant and others (including EP04723989, published under no. 1606135) but is counter-intuitive to readers familiar with more conventional transmissions and will be explained below by reference to an exemplary transmission of toroidal-race, rolling-traction type. It should however be noted that other types of transmission can be constructed which operate by torque control, as to which see for example published European patent application 0736153 (Torotrak (Development) Ltd.)

Figure 1:
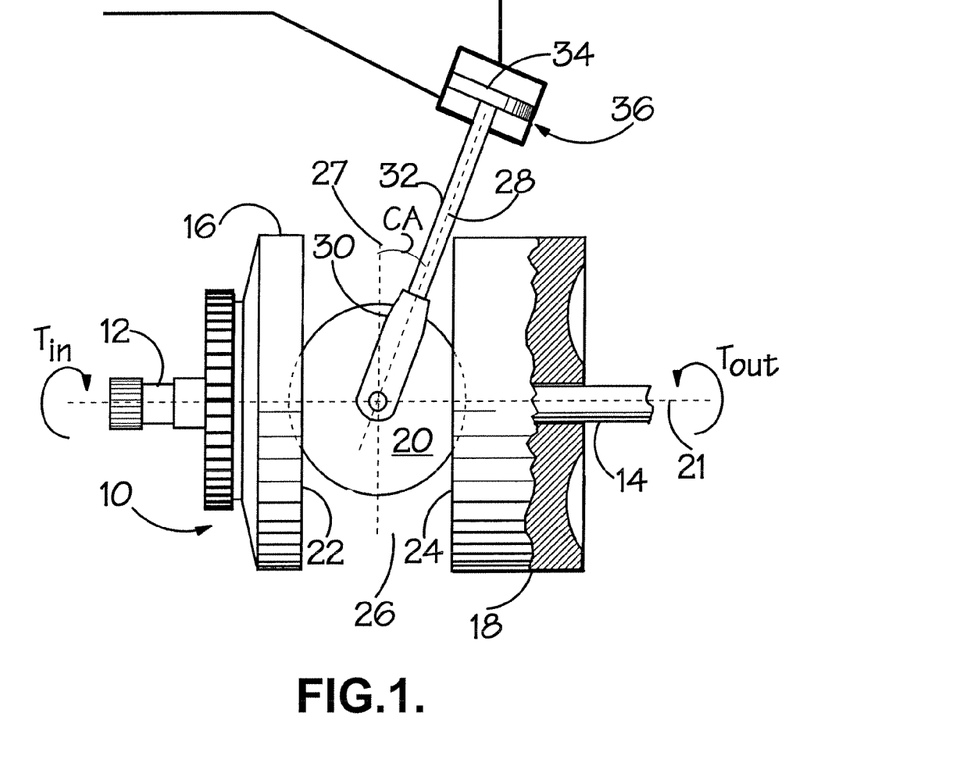
FIG. 1 is a schematic and simplified representation of part of a toroidal-race rolling-traction type variator used in embodiments of the present invention.
Figure 2:
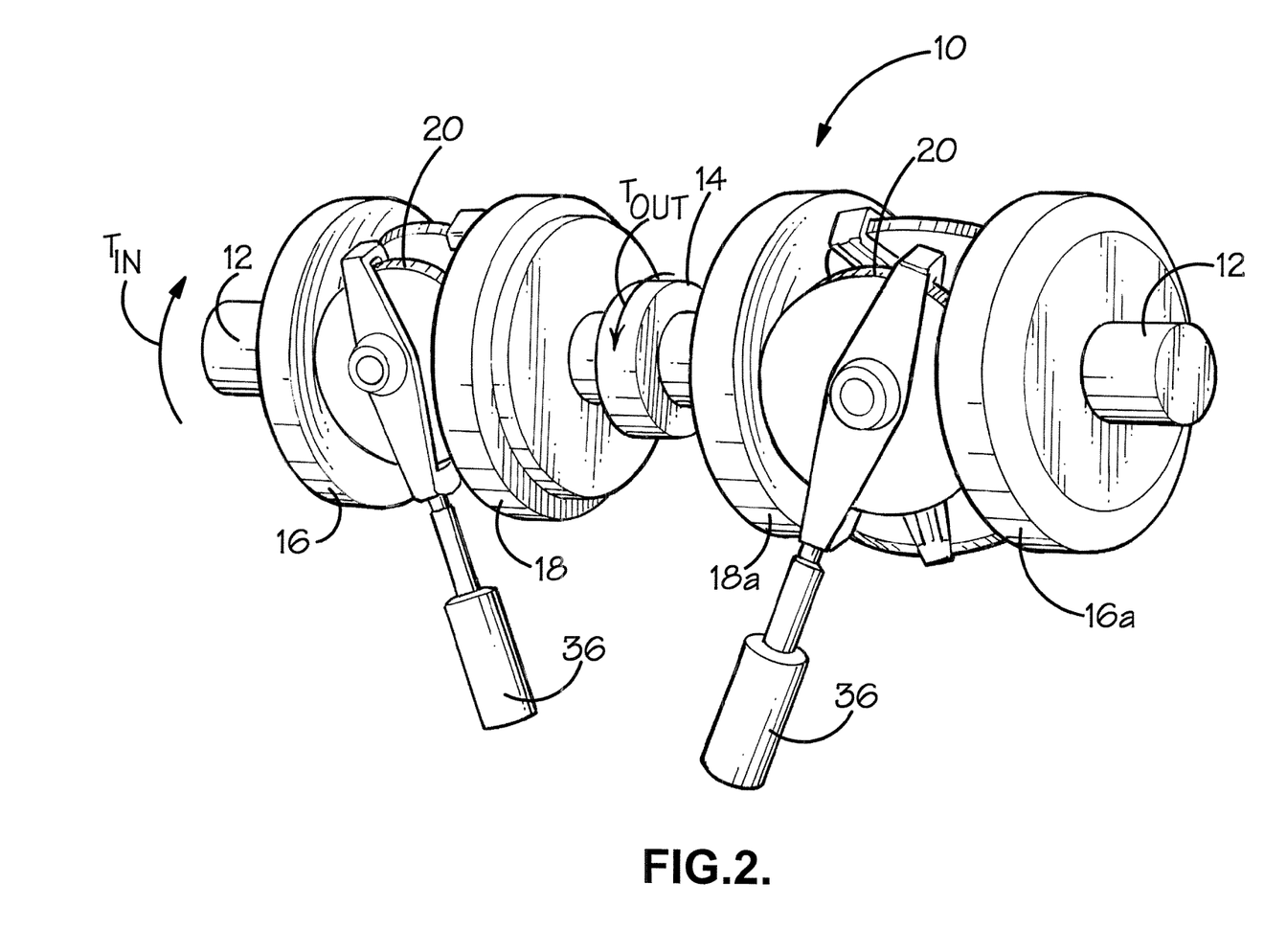
FIG. 2 is a perspective illustration of a variator of the same type.

The variator 10 illustrated in FIGS. 1 and 2 is not in itself novel. The drawings are highly simplified and are intended merely to illustrate its operational principles. Greater constructional detail can be found in previous publications by the applicant including for example published European patent applications 0894210 and 1071891 (Torotrak (Development) Ltd). FIG. 1 shows a variator input shaft 12 and a variator output shaft 14, between which drive is transferred by an arrangement comprising an input race 16, an output race 18, and a set of rollers 20, only one of which is illustrated in FIG. 1. The input and output races are mounted for rotation about a common axis (the variator axis 21) and have facing surfaces 22, 24 which are shaped such that together they define a generally toroidal cavity 26 containing the rollers 20. The rollers 20 run on the shaped faces of both races and so serve to transfer drive from one race to the other. A film of "traction fluid" is maintained between rollers and races to minimise wear at the interface and drive is transmitted by virtue of shear in this film. The races are biased toward each other, typically by means of a hydraulic actuator, not shown, to provide the pressure at the interface needed to enable this transfer of drive.

Each roller 20 is mounted in a manner which permits it three degrees of freedom: (1) it is able to rotate about its own axis, when driven by the races; (2) it is able to move back and forth along a circumferential path 27 about the variator axis 21; and (3) it is able to "process", that is to rotate about a precession axis 28 non-parallel to both the roller axis and the variator axis, changing the roller's inclination. This is achieved in the illustrated variator by journaling the roller in a carriage 30 coupled through a piston rod 32 to a piston 34. The piston 34 is housed in a cylinder 36 to form a hydraulic actuator for applying a controlled biasing force to the roller with a component along its circumferential direction of travel 27.

Note that the precession axis 28 is not perpendicular to the variator axis 21, but is inclined to the perpendicular by a castor angle CA. Furthermore the roller is subject to a steering effect by the races upon which it runs, tending to ensure that the motion of the roller and the adjacent race is parallel at their interface. This is equivalent to saying that the steering effect tends to maintain the roller's axis in intersection with the variator axis 21. As a result, there is a relationship between the roller's circumferential position and its inclination. As the roller moves back and forth, it also precesses—i.e. changes its inclination.

The rollers tend to move in unison and roller inclination corresponds to variator drive ratio. As the inclination of the rollers changes, the radius of the path they trace upon one race decreases, while the radius of the path traced on the other increases, thereby changing the relative speeds of the two races—i.e. changing the drive ratio.

Consider now the torques acting about the variator axis 21. The engine drives the input race 16, applying to it an input torque Tin. The roller is driven by the input race 16 and in turn drives the output race 18, applying to it an output torque Tout. The roller itself is subject to a reaction torque, urging it along its circumferential path, determined by the sum of the input and output torques (which act in opposite directions). The reaction torque is also dependent on the current roller inclination. To keep the roller in position, this reaction torque must be opposed, and in the illustrated embodiment the opposing torque is applied by the hydraulic actuator 8, 34, 36.

Note that although a single roller has been discussed above, the same argument applies collectively to the whole set of rollers. The races tend to drive them in a circle around the variator axis. This is resisted by a net torque applied to the rollers by the respective actuators. Neglecting any torque which goes into accelerating the roller assemblies, the reaction torque Tin+Tout must be equal to the net torque applied by the actuators. By controlling the actuator torque (or equivalently one can speak of the circumferential force applied by each actuator) the reaction torque is controlled. In the illustrated example, using hydraulic actuators, common fluid pressures are applied to opposing sides of each actuator, and the difference in the two fluid pressures determines variator reaction torque.

Whereas FIG. 1 shows only one pair of races defining a single toroidal cavity, practical variators typically have two pairs of races defining two cavities, each containing a respective set of rollers. FIG. 2 shows such an arrangement, most components being direct counterparts to the FIG. 1 version and being given the same reference numerals, although the additional input and output races are referenced as 16a and 18a respectively. Note that the output shaft 14 is positioned between the two output races 18, 18a. Drive from this shaft can be taken through a chain to a layshaft, or through some co-axial arrangement, as is well known.

Figure 3:
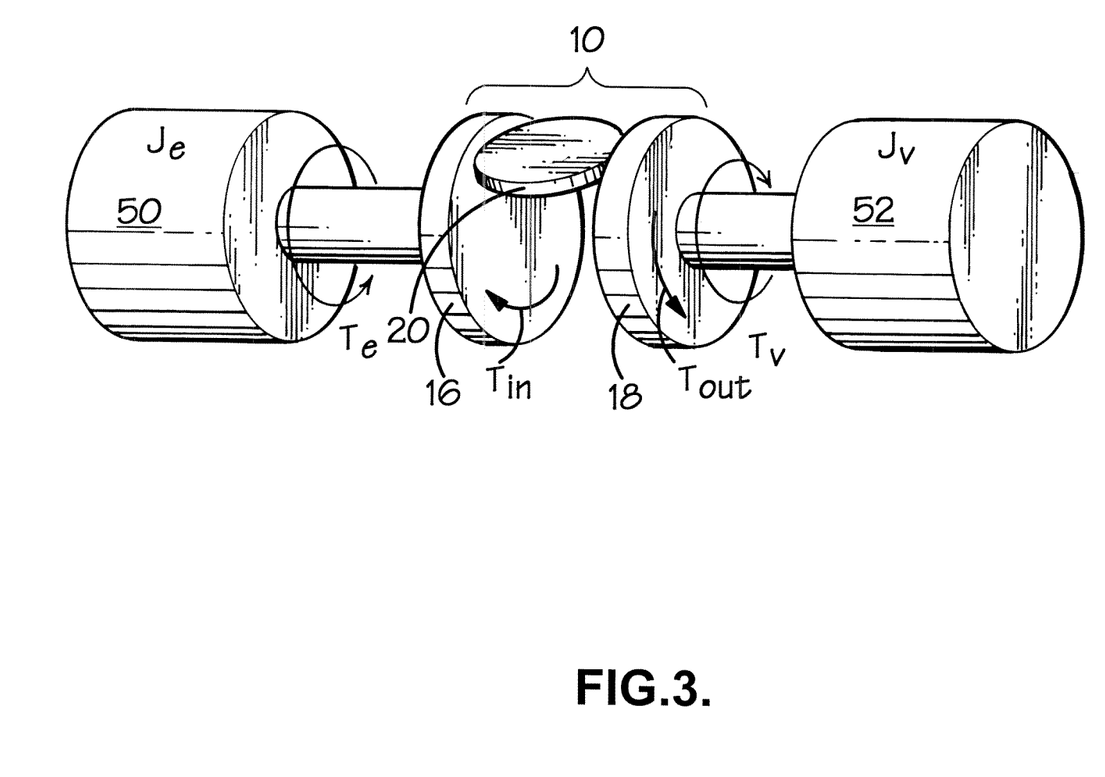
FIG. 3 is a highly schematic representation of a transmission driving a power take off in accordance with the present invention.

It is usual to assume that a transmission will be set to provide a certain drive ratio and will adjust itself accordingly, a mode of operation which may be referred to as "ratio control". This is not the case in a transmission using the torque-controlled variator described above. Instead, the variator regulates torque (specifically, reaction torque) and automatically adjusts itself to accommodate consequent changes of drive ratio. FIG. 3 is intended to illustrate the principle. Once more the variator 10 is illustrated in highly schematic form, only input and output races 16, 18 and a single roller 20 being shown. The variator's input is coupled through gearing to an engine, and in the drawing gearing and engine are represented simply by a box 50, which possesses a moment of inertia Je (contributed by the engine, the gearing and by parts of the variator itself) and exerts a driving engine torque Te on the variator. The variator's output is coupled through gearing to the power take off shaft and so to some external implement. Box 52 represents both the net moment of inertia Jv referred to the variator output (due to inertias of the gearing, of parts of the variator, and of moving parts of the implement) and the retarding torque Tv exerted on the variator output due to the work done by the implement, as well as frictional losses. Recall that the reaction torque Tin+Tout is regulated by the variator. The ratio Tin/Tout is determined by the current variator ratio. Hence the values of Tin and Tout are (neglecting inefficiencies in the variator) determined by the variator reaction torque and the current variator ratio. At the variator output, a net torque Tout-Tv is available to accelerate the output inertia Jv. If this net torque is non-zero then the output speed will change. The variator automatically accommodates this change by virtue of a change in its drive ratio (due to translation and precession of the rollers), and the change of output speed and variator ratio continues until an equilibrium is reached at which Tout is equal to Tv. In principle the same applies mutatis mutandis to the input side of the variator: any imbalance between engine torque Te and the torque Tin created by the variator at its input would result in a change in variator input speed tending to restore equilibrium. However PTOs are often driven by speed governed diesel engines, which automatically adjust their output torque to maintain a chosen engine speed, so that in practice the engine itself may adjust its torque Te to achieve substantially constant speed at the variator input.

The variator regulates its input and output torques, and adjusts itself automatically to the ratio resulting from the action of these torques on the input and output inertias, rather than regulating its drive ratio (as in most other CVTs) and creating torques at input and output necessary to achieve that ratio.

Figure 4:
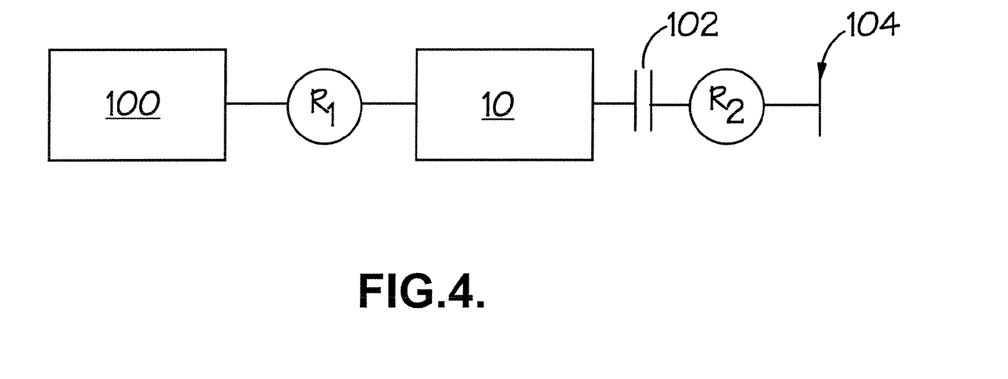
FIG. 4 is a highly schematic representation of a transmission for driving a PTO, embodying the present invention.

As noted above, gearing is provided to couple the variator between the engine and the power take off shaft. FIG. 4 represents a very simple arrangement in which the variator 10 is driven via fixed ratio gearing R1 from the engine 100 and is coupled through a clutch 102 and gearing R2 to the power take off 104. The clutch 102 is used to de-couple the engine from the PTO 104 when necessary, and to effect launch.

Figure 5:
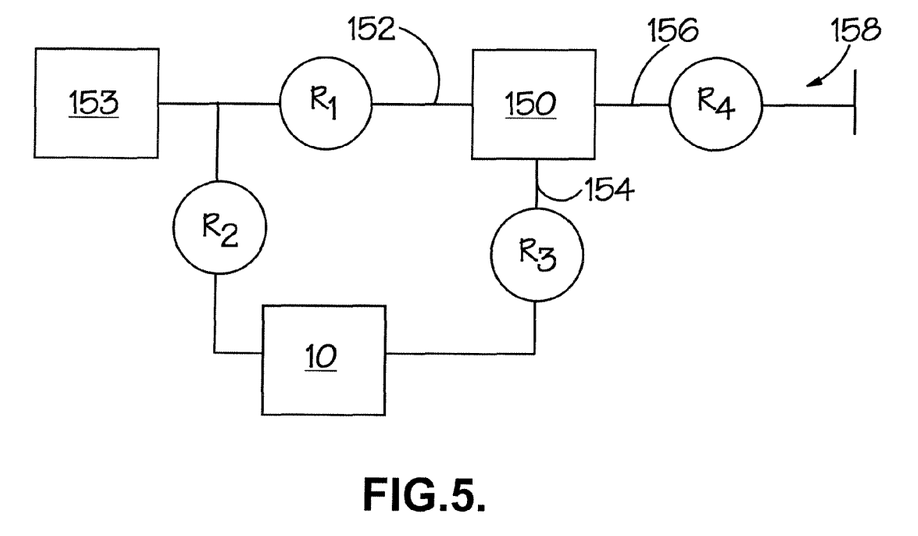
FIG. 5 is a highly schematic representation of a further transmission for driving a PTO, embodying the present invention.

A more sophisticated arrangement is represented in FIG. 5 and uses an epicyclic gear arrangement referred to herein as a "shunt" 150. This general type of arrangement is known in the context of transmissions for drive of motor vehicle wheels. The general construction of an epicyclic gear is very well known and will not be described in detail here. It has three input shafts connected respectively to (1) a sun gear; (2) a ring gear; and (3) a carrier mounting planet gears engaged with the sun gear and ring gear. In the illustrated arrangement one of the shunt's shafts 152 is coupled through gearing R1 to the engine 153. Another of the shunt's shafts 154 is coupled through the variator 10 and gearing R2, R3 to the engine. The third of the shunt's shafts 156 is coupled through final gearing R4 to the PTO 158. This type of arrangement is sometimes referred to as being of "power-recirculatory" type, since power circulates in a loop formed by the shunt and the variator. It has the important advantage that it offers the facility for an infinite speed reduction or "geared neutral". At a certain variator ratio, the inputs 152, 154 to the shunt cancel each other out, so that its output 156 is stationary despite being physically coupled to the moving engine. Because of this geared neutral facility, the arrangement does not require a clutch for de-coupling the PTO from the engine.

The user is of course accustomed to being able to disengage such a clutch in order to achieve a "neutral" state in which the PTO freewheels. An equivalent state can however easily be achieved in the illustrated arrangement by virtue of the use of a torque-controlled variator, by setting the variator to provide zero reaction torque. In this case, neglecting frictional losses, the variator's input and output torques are correspondingly zero. The output freewheels, while the variator ratio changes as necessary to accommodate consequent changes in PTO speed. Thus for example if the arrangement is placed in this quasi-neutral state while the PTO is connected to a moving load, such as a baling machine, then drive is removed from the load which comes to a natural halt, while the variator ratio automatically moves to the geared neutral ratio, allowing the engine to continue running. In the hydraulically controlled variator described above, the quasi-neutral state is achieved simply by equalising pressures on the two sides of the piston 34.

Figure 6:
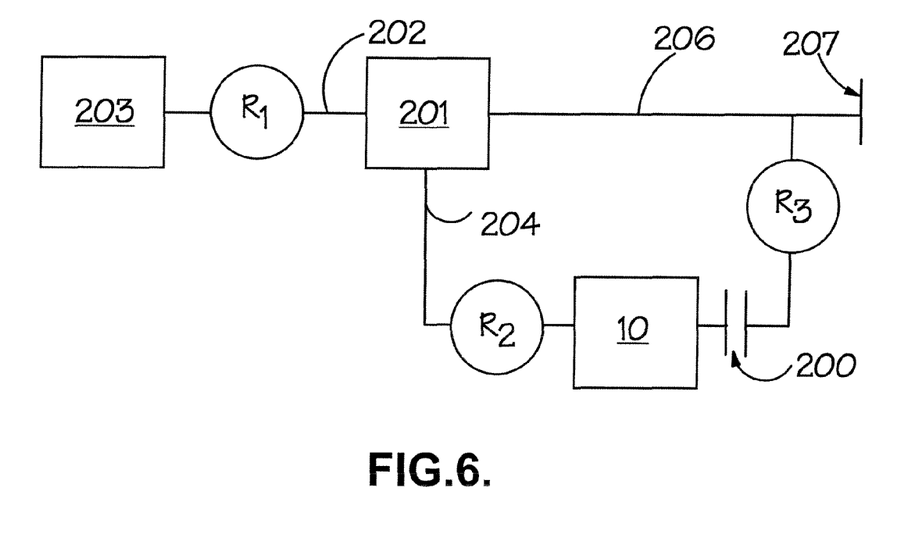
FIG. 6 is a highly schematic representation of still a further transmission for driving a PTO, embodying the present invention.

The alternative arrangement illustrated in FIG. 6 does not provide for geared neutral and consequently requires a clutch 200. It is advantageous in that the proportion of the total power routed through the variator can be reduced. The torque and power delivered to a PTO can be large. It is desirable to deliver as much power as possible through gearing and as little as possible through the variator itself, which both improves efficiency and allows the weight and bulk of the variator to be reduced. In this arrangement the shunt 201 has a first shaft 202 coupled through gearing R1 to the engine 203; a second shaft 204 coupled through gearing R2 to the input side of the variator 10; and a third shaft 206 coupled to the PTO 207 via gearing R3. The third shaft 206 is additionally able to be coupled to the output side of the variator by engagement of the clutch 200. When the clutch 200 is disengaged, the variator and the second shaft 204 freewheel. Consequently the shunt as a whole is likewise able to freewheel. No drive is transmitted from its first shaft 202 to its third shaft 206 and the arrangement is thus in neutral. When the clutch is engaged, the variator dictates the overall drive ratio and some power is necessarily recirculated through the variator, but by appropriate choice of gear ratios it can be ensured that this is a small part of the total power transmitted.

Control of the PTO arrangement could conceivably be achieved through a purely mechanical/hydraulic arrangement, but the preferred mode of control uses a microprocessor receiving inputs indicative of instantaneous input and output speeds and other operating variables, and providing outputs to hydraulic valves controlling the variator, and where appropriate its associated clutch. The variator control valves regulate the pressures applied to the two sides of the variator pistons 34, and so determine variator reaction torque.

The controls provided to the user can be simple. A typical embodiment uses an on/off control to switch between neutral and drive, the variator (and, where present, clutch) being correspondingly controlled by the microprocessor. Agricultural PTOs are most often required to operate at a constant speed, such as 1000 rpm. A user-operable control may be provided to select the speed, from a range or from a set of discrete alternatives. Finally a control may be provided to allow the user to regulate the level of output torque upon launch—in effect, to control how fast the launch is.

As noted above, the engine used to drive a PTO will in many cases be speed governed—i.e. will be capable of maintaining a set speed. Also the requirement at the PTO will in many cases be for a fixed output speed. With a conventional transmission, the required output speed results from the choice of input speed and drive ratio. Note however that the type of torque-controlled variator described herein does not provide for direct control of ratio. Hence in order to maintain a required output speed, a controller is required to adjust variator reaction torque as necessary to maintain PTO output speed. This could for example be achieved by means of a centrifugal governor, but the preferred solution is again to have this function carried out by the microprocessor. The simplest approach is to adjust reaction torque based upon feedback of output speed, using for example a proportional integral differential (PID) controller. A commonplace alternative to controlling for constant PTO speed is to link the PTO speed to vehicle ground speed. This may be achieved by supplying vehicle ground speed to the controller, or by driving the PTO and the vehicle wheels from the same transmission.

The use of a torque-controlled variator makes possible advantageous strategies for launch of the PTO. A simple strategy for controlling the type of arrangement seen in FIG. 5 is simply to switch, upon launch, from zero reaction torque to some fixed reaction torque value, set using the variator control valves. Note that this is not the equivalent of a sudden engagement of the clutch in a conventional PTO arrangement, where there is the risk of engine stall due to the mismatch of engine and PTO speeds. Raising the reaction torque creates torque at the PTO output and causes a corresponding torque to be applied to the engine, but does not necessitate any instantaneous change in drive ratio. Instead the PTO load is able to accelerate from rest at a rate dictated by its inertia, while the engine continues to rin at its set speed, the variator automatically accommodating the consequent progressive change in drive ratio. Furthermore, the FIG. 5 arrangement automatically provides a "soft start" where the load applied to the engine increases progressively. To understand why, recall that geared neutral is in effect an infinite speed reduction from engine to PTO. At geared neutral (neglecting frictional effects) the load applied to the engine is zero regardless of the torque created at the PTO output. As the output speed increases, the variator maintains a constant value of reaction torque, but the ratio of engine load torque to PTO output torque gradually increases. Hence high torque can be applied to initially accelerate the load, without engine stall problems. More sophisticated launch strategies, involving control of the load's acceleration, can easily be implemented using the microprocessor. Where the PTO arrangement incorporates a clutch, separate hydraulics may be provided for controlling clutch apply pressure and variator control pressures. Alternatively, the same hydraulic pressure could be applied to both variator and clutch, and be gradually increased upon launch to provide a soft start.

Problems of engine stalling in normal operation, as opposed to launch, are also easily addressed by virtue of the present invention. Loads on PTO driven implements can vary dramatically, e.g. due to variations in the properties of material being processed. A particularly wet or thick area of grass encountered by a forage harvester, for example, may (in a conventional PTO arrangement using a fixed drive ratio) overload the engine which, having insufficient power to maintain its speed, stalls. Consider what happens when a torque controlled PTO arrangement encounters the same situation. The load on the PTO increases. If variator reaction torque is not adjusted then this results in the PTO load exceeding the torque available to drive it. The PTO consequently slows down, and the variator automatically accommodates the consequent change in drive ratio while maintaining the set reaction torque. Engine speed can be maintained. The reduction in drive ratio results in an increase in PTO output torque, so that at some point an equilibrium can be reached where the engine is able to drive the PTO at constant, albeit reduced, speed. The situation is complicated slightly by the provision of a controller which attempts to maintain constant PTO output, but in this context it is straightforward to implement a strategy which simply limits the reaction torque based upon a maximum load which can be applied to the engine, allowing the variator to operate as described when necessary.

Reference was made above to problems associated with PTOs used to drive wheels of trailers or articulated vehicles, where there is a mismatch in wheel speeds. These problems are easily avoided with the types of PTO encountered herein, because it is not necessary to set the speed of the PTO and hence of the wheels it drives. Instead, the setting of reaction torque determines (for a given drive ratio) the torque applied at the wheels. Their speed is free to vary as necessary to match the overall vehicle speed, with consequent changes in drive ratio being accommodated automatically by the variator. Sophisticated strategies involving adjustment of the wheel torque in accordance with terrain, driver requirements etc. can also be implemented.

With regard to engine efficiency, improvements as compared with conventional PTO drive arrangements can be made by virtue of coordinated control of the engine and the transmission driving the PTO. Thus for example engine speed can be reduced when the power requirement is small, with the variator being adjusted to maintain output speed, reducing fuel consumption.

What is claimed is:

1. A drive arrangement for a motor vehicle power take off (PTO) comprising a PTO shaft arranged and adapted for coupling to a power driven implement, an input shaft arranged and adapted for coupling to a rotary driver, and a continuously variable transmission coupled between the input and PTO shafts to transfer drive between them at a continuously variable drive ratio, wherein the continuously variable transmission comprises a ratio varying unit ("variator") which has a rotary variator input and a rotary variator output and in that the drive arrangement further comprises a controller which serves to control variator input and output torques wherein the transmission automatically accommodates changes in speed at the PTO shaft by virtue of changes in its drive ratio such that in response to excessive load applied to the power take off shaft, variator input and output torques are limited by the controller and slowing of the power take off shaft due to the load applied to it is automatically accommodated by virtue of a change in variator ratio.

2. The drive arrangement as claimed in claim 1, wherein the variator is of toroidal race type.

3. The drive arrangement as claimed in claim 1, wherein the controller controls variator input and output torques to provide constant PTO speed during normal operation.

4. The drive arrangement as claimed in claim 3 wherein variator input and output torques are controlled based upon feedback of power take off shaft speed.

5. The drive arrangement as claimed in claim 1, comprising an epicyclic shunt gear operably coupled to the variator and to the PTO.

6. The drive arrangement as claimed in claim 5 wherein respective inputs of the shunt gear are coupled to the input shaft through the variator and through a fixed ratio gear chain, such that at a certain variator ratio the two shunt inputs cancel each other out and provide a geared neutral state in which the PTO shaft is stationary despite being mechanically coupled to the moving input shaft.

7. The drive arrangement as claimed in claim 6, having means for setting the variator input and output torques to zero and thereby providing a quasi-neutral state in which the PTO shaft is able to freewheel despite being mechanically coupled to the input shaft.

8. The drive arrangement as claimed in claim 7, comprising means for controlling launch of the PTO from the quasi-neutral state by raising variator input and output torques to create a driving torque at the PTO shaft, wherein the variator automatically accommodates consequent acceleration of the PTO shaft by virtue of changes in its drive ratio.

9. The drive arrangement as claimed in claim 8 which is constructed and arranged such that, for a given input and output torques and engine speed, output torque diminishes with increasing output speed.

10. The drive arrangement as claimed in claim 1, comprising a clutch arranged to make and break an operative coupling between the input shaft and the PTO shaft.

11. The drive arrangement as claimed in claim 10 wherein both the variator input and output torques and the clutch are hydraulically controlled, means being provided for supplying the same hydraulic pressure to both.

12. The method of controlling a motor vehicle power take off comprising a PTO shaft arranged and adapted for coupling to a power driven implement, an input shaft arranged and adapted for coupling to a rotary driver, and a continuously variable transmission incorporating in the transmission a ratio varying unit ("variator") which has a rotary variator input and a rotary variator output coupled between the input and PTO shafts to transfer drive between them, comprising regulating variator input and output torques and permitting transmission ratio to vary in accordance with changes in output speed resulting from application of consequent transmission output torque to an inertial load referred to the PTO shaft.

13. The method as claimed in claim 12 comprising providing a quasi-neutral state by setting variator input and output torques to zero.

14. The method as claimed in claim 13 wherein the quasi-neutral state is provided in response to a user requirement.

15. The method as claimed in claim 12 comprising launching an implement coupled to the PTO, from a static condition at which variator input and output torques are set to zero, by raising variator input and output torques to create a driving torque at the PTO shaft and allowing the variator drive ratio to automatically change to accommodate consequent acceleration of the PTO shaft.

16. The drive arrangement as claimed in claim 1, wherein the PTO shaft is arranged and adapted for coupling to a point of power usage of the power driven implement other than wheels of the power driven implement.

17. The method as claimed in claim 12, wherein the PTO shaft is arranged and adapted for coupling to a point of power usage of the power driven implement other than wheels of the power driven implement.

18. The drive arrangement as claimed in claim 1, wherein the rotary variator input and the rotary variator output are co-axial.

\* \* \* \* \*